(12) United States Patent
Katic et al.

(10) Patent No.: US 9,832,284 B2
(45) Date of Patent: Nov. 28, 2017

(54) MAINTAINING CACHED DATA EXTRACTED FROM A LINKED RESOURCE

(71) Applicant: Facebook, Inc., Menlo Park, CA (US)

(72) Inventors: Vojin Katic, Menlo Park, CA (US); Avichal Garg, Palo Alto, CA (US)

(73) Assignee: FACEBOOK, INC., Menlo Park, CA (US)

( * ) Notice: Subject to any disclaimer, the term of this patent is extended or adjusted under 35 U.S.C. 154(b) by 115 days.

(21) Appl. No.: 14/141,678

(22) Filed: Dec. 27, 2013

(65) Prior Publication Data

US 2015/0186390 A1   Jul. 2, 2015

(51) Int. Cl.
| | | |
|---|---|---|
| *H04L 29/06* | (2006.01) | |
| *H04L 29/08* | (2006.01) | |
| *G06F 17/30* | (2006.01) | |
| *G06F 17/22* | (2006.01) | |
| *G06F 17/21* | (2006.01) | |
| *G06F 15/16* | (2006.01) | |

(52) U.S. Cl.
CPC ........ *H04L 67/42* (2013.01); *G06F 17/30902* (2013.01); *H04L 67/2842* (2013.01)

(58) Field of Classification Search
CPC ...... G06F 17/30; G06F 17/22; G06F 17/2235; G06F 17/3089; G06F 17/21; G06F 15/16; H04L 29/06; H04L 29/08; H04L 67/2842; H04L 65/403
USPC .......... 711/137, 154, 156, 158; 707/999.001, 707/E17.001, E17.108; 709/206; 715/205, 243
See application file for complete search history.

(56) References Cited

U.S. PATENT DOCUMENTS

| | | | |
|---|---|---|---|
| 5,978,842 A | | 11/1999 | Noble et al. |
| 6,011,537 A | * | 1/2000 | Slotznick .................. G06F 3/14 707/E17.119 |
| 6,055,570 A | * | 4/2000 | Nielsen ............. G06F 17/30899 707/E17.119 |
| 7,433,895 B2 | | 10/2008 | Li et al. |
| 7,478,054 B1 | | 1/2009 | Adams et al. |
| 7,751,592 B1 | | 7/2010 | Rosenberg et al. |
| 7,788,258 B1 | | 8/2010 | Malpani et al. |
| (Continued) | | | |

OTHER PUBLICATIONS

Final Office Action dated Apr. 8, 2016 for U.S. Appl. No. 14/174,627, filed Feb. 6, 2014, 26 pages.

(Continued)

*Primary Examiner* — Philip Chea
*Assistant Examiner* — Hassan Khan
(74) *Attorney, Agent, or Firm* — Nicholson De Vos Webster & Elliott LLP (57) ABSTRACT

Exemplary methods, apparatuses, and systems include a network service receiving a request including a hyperlink. The network service acquires data from a resource referenced by the hyperlink. The network service stores the acquired data within a network service cache and sets a refresh interval. The network service utilizes the stored data to respond to additional requests including the hyperlink received during the refresh interval. The network service reacquires data from the resource after the expiration of the refresh interval. The refresh interval is updated by increasing or decreasing a frequency of the refresh interval in response to an amount of change to data associated with the resource over time.

19 Claims, 6 Drawing Sheets

(56) References Cited

U.S. PATENT DOCUMENTS

| | | | |
|---|---|---|---|
| 7,873,988 B1 | 1/2011 | Issa et al. | |
| 7,992,171 B2 | 8/2011 | Amidon et al. | |
| 8,054,496 B1* | 11/2011 | Rehfeld | G06F 17/212 358/1.13 |
| 8,306,326 B2 | 11/2012 | Behm et al. | |
| 8,745,481 B1 | 6/2014 | Ulm | |
| 9,183,657 B2 | 11/2015 | Belanger et al. | |
| 9,256,620 B2 | 2/2016 | Amacker et al. | |
| 9,659,104 B2 | 5/2017 | Soon-Shiong et al. | |
| 2002/0073058 A1* | 6/2002 | Kremer | G06F 17/30864 |
| 2002/0194434 A1* | 12/2002 | Kurasugi | G06F 17/30902 711/137 |
| 2002/0199187 A1 | 12/2002 | Gissin et al. | |
| 2003/0004909 A1 | 1/2003 | Chauhan et al. | |
| 2004/0205514 A1* | 10/2004 | Sommerer | G06F 17/212 715/205 |
| 2005/0198299 A1 | 9/2005 | Beck et al. | |
| 2005/0216300 A1* | 9/2005 | Appelman | G06Q 10/10 705/319 |
| 2006/0112092 A1 | 5/2006 | Ziou et al. | |
| 2006/0287916 A1 | 12/2006 | Starr et al. | |
| 2007/0073833 A1* | 3/2007 | Roy | G06F 17/30873 709/217 |
| 2007/0078850 A1 | 4/2007 | Aziz et al. | |
| 2007/0112819 A1 | 5/2007 | Dettinger et al. | |
| 2008/0027928 A1 | 1/2008 | Larson | |
| 2008/0133311 A1 | 6/2008 | Madriz | |
| 2008/0154931 A1 | 6/2008 | Jacobs et al. | |
| 2009/0034851 A1 | 2/2009 | Fan et al. | |
| 2009/0099919 A1 | 4/2009 | Schultheiss et al. | |
| 2009/0259723 A1 | 10/2009 | Roic et al. | |
| 2010/0114899 A1 | 5/2010 | Guha et al. | |
| 2010/0293048 A1 | 11/2010 | Singolda et al. | |
| 2011/0022641 A1* | 1/2011 | Werth | H04L 67/34 707/803 |
| 2011/0078587 A1 | 3/2011 | Guy et al. | |
| 2011/0145698 A1* | 6/2011 | Penov | G06F 17/272 715/235 |
| 2011/0164126 A1 | 7/2011 | Ambor et al. | |
| 2011/0264641 A1 | 10/2011 | Yang et al. | |
| 2011/0265011 A1* | 10/2011 | Taylor | G06Q 50/01 715/751 |
| 2012/0017179 A1 | 1/2012 | Yoon et al. | |
| 2012/0158494 A1* | 6/2012 | Reis | G06Q 30/0241 705/14.49 |
| 2012/0232973 A1 | 9/2012 | Robb et al. | |
| 2012/0269425 A1 | 10/2012 | Marchesotti et al. | |
| 2012/0278338 A1 | 11/2012 | Liao et al. | |
| 2013/0080900 A1* | 3/2013 | Wilde | G06F 17/30893 715/736 |
| 2013/0084912 A1 | 4/2013 | Lindner et al. | |
| 2013/0097625 A1 | 4/2013 | Thorwirth et al. | |
| 2013/0237325 A1 | 9/2013 | Chudley et al. | |
| 2013/0259375 A1 | 10/2013 | Dunlop et al. | |
| 2013/0262559 A1 | 10/2013 | Neerings et al. | |
| 2013/0268829 A1* | 10/2013 | Lansford | G06F 17/2235 715/205 |
| 2014/0059436 A1 | 2/2014 | Swenson et al. | |
| 2014/0075296 A1 | 3/2014 | Schaad et al. | |
| 2014/0146095 A1 | 5/2014 | Park et al. | |
| 2014/0258849 A1 | 9/2014 | Chung et al. | |
| 2015/0012811 A1* | 1/2015 | Chan | G06F 17/30873 715/234 |
| 2015/0095770 A1 | 4/2015 | Mani et al. | |
| 2015/0143211 A1* | 5/2015 | Kaufthal | G06F 17/3089 715/205 |
| 2015/0220787 A1 | 8/2015 | Folkens et al. | |
| 2015/0331552 A1 | 11/2015 | Young et al. | |
| 2015/0331842 A1 | 11/2015 | Costa et al. | |
| 2015/0332384 A1 | 11/2015 | Garcia | |
| 2016/0004711 A1 | 1/2016 | Soon-Shiong et al. | |
| 2016/0286256 A1 | 9/2016 | Shin et al. | |
| 2016/0308805 A1 | 10/2016 | Gao et al. | |
| 2016/0342624 A1 | 11/2016 | Mazur et al. | |
| 2017/0024399 A1 | 1/2017 | Boyle et al. | |

OTHER PUBLICATIONS

Non-Final Office Action dated Jan. 20, 2016 for U.S. Appl. No. 14/174,676, filed Feb. 6, 2014, 18 pages.

Non-Final Office Action dated Feb. 26, 2016 for U.S. Appl. No. 14/292,579, filed May 30, 2014, 14 pages.

Non-Final Office Action dated Nov. 6, 2015 for U.S. Appl. No. 14/174,627, filed Feb. 6, 2014, 21 pages.

Final Office Action from U.S. Appl. No. 14/174,676 dated Jul. 28, 2016, 19 pages.

Final Office Action from U.S. Appl. No. 14/292,579 dated Oct. 12, 2016, 20 pages.

Notice of Allowance from U.S. Appl. No. 14/174,627 dated Jul. 29, 2016, 12 pages.

Non-Final Office Action from U.S. Appl. No. 14/174,676 dated Nov. 30, 2016, 20 pages.

Non-Final Office Action from U.S. Appl. No. 14/292,579 dated Dec. 27, 2016, 14 pages.

Final Office Action from U.S. Appl. No. 14/174,676, dated Jun. 16, 2017, 21 pages.

Non-Final Office Action from U.S. Appl. No. 14/292,579, dated Jul. 14, 2017, 16 pages.

* cited by examiner

MAINTAINING CACHED DATA EXTRACTED FROM A LINKED RESOURCE

FIELD

The various embodiments described herein relate to maintaining a cache of data extracted from a linked resource. In particular, the embodiments relate to a network service caching data acquired from a linked resource, reacquiring the data at a time interval, and updating the time interval based upon an amount of change to data associated with the resource over time.

BACKGROUND

Social networking systems enable users to interact with various objects represented within the social network. For example, a social networking system allows users to designate other users or entities as connections (or otherwise connect to, or form relationships with, other users or entities), contribute and interact with their connections, post media or commentary, share links to external content, use applications, join groups, list and confirm attendance at events, invite connections, and perform other tasks that facilitate social interaction. External applications also use the services of a social networking system to allow authenticated users to incorporate some of the above social interactions with use of the external applications. Similar interactions may also be a part of the user experience within other network services.

Sharing a link (e.g., a Uniform Resource Locator (URL), Uniform Resource Identifier (URI), or other address or reference to a source of data, collectively referred to herein as a "link" or "hyperlink") as a post within a social network enables users to select or otherwise activate the link (e.g., by copying and pasting the link into a browser application). Doing so causes the user's processing device (e.g., via the browser application) to render the linked content. A user viewing the link alone, however, may not want to follow the link without some indication of the underlying content. As a result, a social networking system may generate a preview including one or more of an image, title, and summary data from the linked content. For example, the social networking system uses a scraping algorithm to extract the preview content from the linked resource and publish the preview content along with the link.

Requests to share the same linked content may be received in great numbers. In the interest of conserving processing resources, the social networking system caches or otherwise stores a copy of the preview content for reuse. Linked content, however, may change over time. As a result, the preview content may no longer accurately represent the linked content. Additionally, different sources of linked content change at different rates.

SUMMARY OF THE DESCRIPTION

Exemplary methods, apparatuses, and systems maintain a cache of data extracted from a linked resource. Network services often receive a request including or mapped to a hyperlink. For example, a social networking system may receive a request to publish a hyperlink to a social network to encourage other users to view the linked content. In response to the request, the network service acquires data from a resource referenced by the hyperlink. In one embodiment, the data is a subset of the content of the linked resource. The network service uses the acquired data to serve the request associated with the associated hyperlink. For example, a social networking system may publish at least some of the acquired data as a preview of the content of the resource referenced by the hyperlink. As a result, users viewing the published post including the hyperlink will have a preview of the content stored at the linked resource.

In addition to serving a request associated with the received hyperlink, the network service stores the acquired data within a network service cache to serve future requests. The network service sets a refresh interval for the cached data in an effort to accurately represent the linked content as the cached version of the data ages. Upon expiration of the refresh interval, the network service reacquires data from the resource. For example, the social networking system utilizes stored data to generate previews when additional requests including the hyperlink are received during the refresh interval. The social networking system reacquires the data from the resource after the expiration of the refresh interval.

Given that different sources of linked content change at different rates, the refresh interval is updated by increasing or decreasing a frequency of the refresh interval in response to an amount of change to data associated with the resource over time. As a result, the network service is able to refresh cached data often for a resource data with data that is likely to change often (e.g., a news website) while conserving resources by refreshing cached data less often for a resource data with data that is not likely to change often (e.g., a business website).

Other features and advantages will be apparent from the accompanying drawings and from the detailed description.

BRIEF DESCRIPTION OF THE DRAWINGS

The present invention is illustrated by way of example and not limitation in the figures of the accompanying drawings, in which like references indicate similar elements, and in which.

DESCRIPTION OF EMBODIMENTS

Embodiments described herein cache a copy of data acquired from a resource referenced by a hyperlink. The data is reacquired after the expiration of a refresh interval. The refresh interval is set to a default value or a value based upon resource metadata and/or a history of changes to data associated with the resource. As additional metadata and/or history data is obtained, embodiments update the refresh interval. As a result, embodiments described herein maintain the cache by refreshing data at a high rate when the corresponding resource data is likely to change often and by refreshing data at a low rate when the corresponding resource data is not likely to change often.

Figure 1:
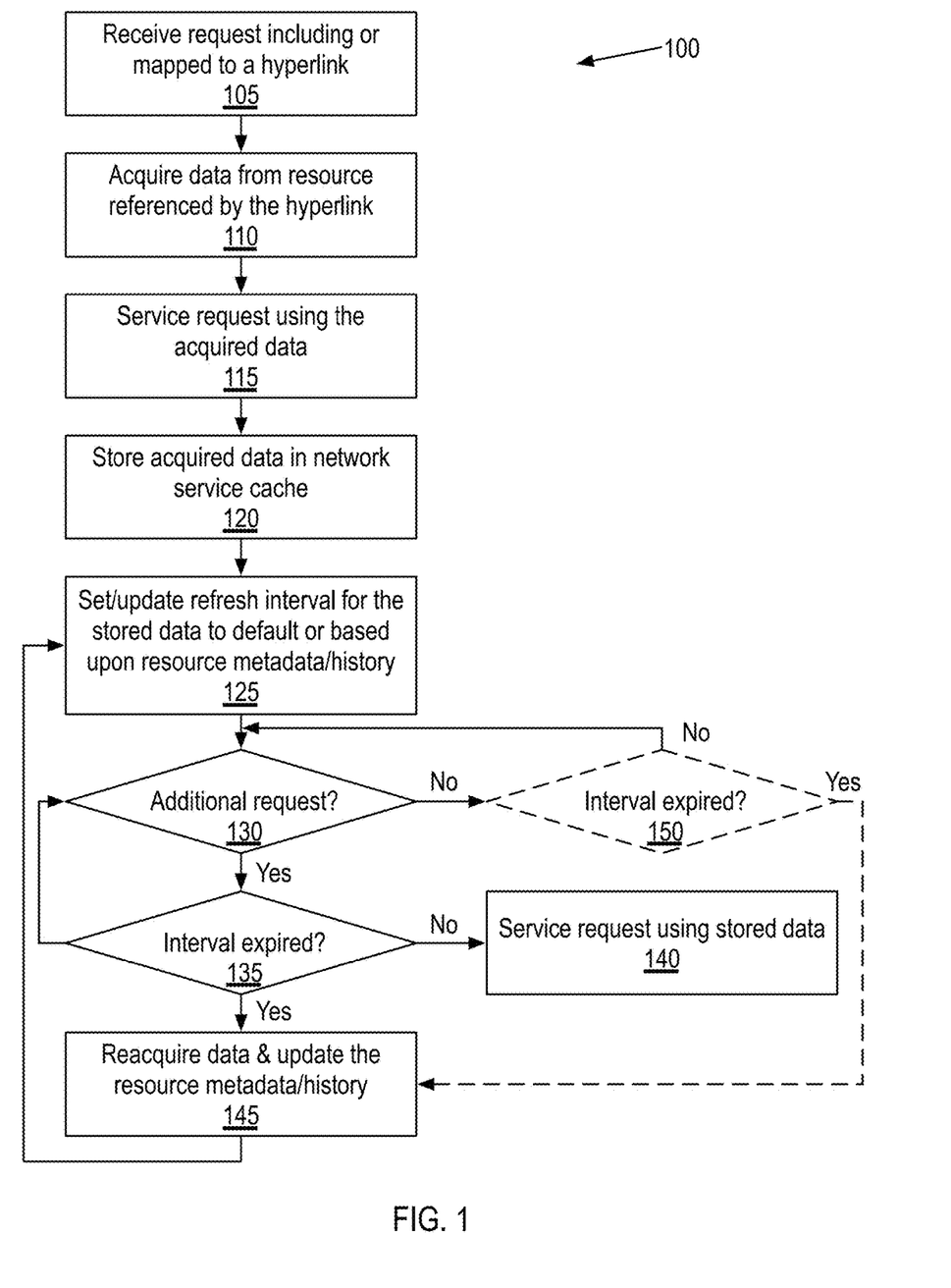
FIG. 1 is a flow chart illustrating an exemplary method of maintaining cached data extracted from a linked resource.

FIG. 1 is a flow chart illustrating exemplary method 100 of maintaining cached data extracted from a linked resource. At block 105, a network service receives a request including or mapped to a hyperlink. As described above, references herein to a hyperlink include a URL, URI, or other address or reference to a resource of data (such as a website) that enables a processing device to navigate to a resource, acquire data from a resource, display data from a resource, etc. The received request includes or is mapped to a hyperlink that references a resource including data that is not currently cached by the network service. Requests that include or are mapped to a hyperlink that references a resource including data that is currently cached by the network service are described below, e.g., with reference to block 130.

In one embodiment, the network service is a social networking system. In such an embodiment, a user device communicates with the social networking system via an application such as a web browser or native application. Within the social networking application, the user enters a hyperlink, e.g., to share as a publication. In another embodiment, the network service an enterprise website that receives a request corresponding to linked data. For example, the request may include the hyperlink or keywords that are mapped to the hyperlink.

At block 110, the network service acquires data from the source referenced by the hyperlink. The resource may include one or more of a webpage, image, video, style sheet, client-side script (e.g., JavaScript), etc. The network service navigates to or otherwise requests data from the resource identified by the hyperlink. The resource includes content that the user is attempting to share or otherwise retrieve. For example, a user may share a URL of a webpage that includes a text, image(s), and/or video (i.e., the content) via a social networking system. Additionally, the webpage may also include other multimedia, advertisements, etc. Exemplary types of content include an article, an essay, a photograph, an illustration, a movie/video, a game, a tutorial, source code for a computer program, a combination of one or more of these items, or any other type of information or data available on the internet.

At block 115, the network service responds to the request using the acquired data. In one embodiment, servicing the request includes generating a preview of a shared hyperlink (e.g., during composition of a post or after publication of the hyperlink within a post to the social network). For example, the network service may identify or generate a representative title, summary, and image for the linked content using the acquired data. The generation of a preview is described further with reference to FIGS. 3 and 4.

At block 120, the network service stores the acquired data in a cache. Storing the acquired data includes storing (or updating as applicable) the hyperlink, any portion of the content used to service requests including or mapped to a hyperlink, metadata for the hyperlink, and history data for requests including or mapped to the hyperlink. Exemplary metadata includes a number of times a request is received (in total and/or within a period of time) that includes or is mapped to the hyperlink, a number of times a request is received (in total and/or within a period of time) that includes or is mapped to the domain of the hyperlink/portion of the domain, times (e.g., date/time) at which the network service receives requests including or mapped to the hyperlink/domain of the hyperlink/portion of the domain, a category or content type for the content referenced by the hyperlink/domain of the hyperlink/portion of the domain (e.g., news, sports, blog, live blog, product, business, etc.), a date/time the content was created, tagged, or acquired, a copyright date, a recommended refresh interval (e.g., a time to live (TTL) value) from the creator or publisher of the content, a trust score for creator or publisher, etc. For example, the linked resource may include a meta tag (according to the Facebook Open Graph Protocol or another protocol) within a portion of the resource document that indicates the a category/content type or recommended refresh interval.

Exemplary history data includes data on timeouts or other errors in acquiring data from the resource referenced by the hyperlink/other references within the domain of the hyperlink/portion of the domain and a history of changes (e.g., percentage of times a change is detected) to the hyperlink, title, image(s), author, summary/byline, content text, or other content referenced by the hyperlink/domain of the hyperlink/portion of the domain. For example, a news article referenced by a hyperlink may be posted at a resource. Subsequently, as the story develops, the text of the news article is updated. Additionally, the news article may have been posted without a photo and subsequently updated to include a photo. In yet another example, the article may be moved to a different hyperlink. Each of these exemplary changes to the linked content may result in the network service storing history data representing the change. Additionally, upon determining that the original hyperlinked resource includes a hyperlink redirect message, tag, script, or other redirection or forwarding to another hyperlink, the network service updates the history data to account for the change and updates the hyperlink used to service received requests. History data may further include times (e.g., days of the week and times of the day) at which the changes are more or less likely to occur. For example, one resource may regularly change during business hours on weekdays while another changes regularly on weekends. Advertising content may not be representative of the content to be shared or otherwise retrieved. As such, changes to advertising content may be excluded from history data.

As used herein, a portion of a domain includes a portion of a website. In one embodiment, given that some of the metadata and history data above relates to a domain or portion thereof, and therefore to multiple hyperlinks, at least some metadata and history data is mapped to the hyperlink(s). As a result, updates to such metadata or history data can be made to a single copy rather than within a record for each hyperlink.

At block 125, the network service sets a refresh interval for the stored data. If the received request is the first time the network service received a request including or mapped to the hyperlink or the domain of the hyperlink or to a portion of the domain, the refresh interval is set to a default value. For example, the refresh interval may be set to a number of hours or days. In one embodiment, the refresh interval is set based upon one or more of metadata for the hyperlink/domain of the hyperlink/portion of the domain, history data for a hyperlink/domain of the hyperlink/portion of the domain, and metadata or history data for a hyperlink/domain/portion of a domain with a common characteristic. For example, a refresh interval for a hyperlink within the sports or news category is shorter than a refresh interval for a hyperlink within a product or business category. Additionally, an author or creator of the content may be associated with a particular refresh interval. The creator is a person or entity associated with the creation of the content—e.g., a person or entity that wrote, recorded, captured, illustrated, arranged, composed, edited, photographed, and/or modified the content. For example, an article on the website of an online magazine may have a creator that is the author of the article, a creator that is a photographer of an image in the article, a creator that is an author of a comment made about the article, or even a creator that is an entity representing the online magazine (i.e., the publisher). Even if the received request is the first time the network service received a request including or mapped to a hyperlink/domain of the hyperlink/portion of the domain, the network service may have acquired data, metadata, and history data for one or more hyperlinks within another domain/portion of a domain and including content by the same creator. If the creator is associated with a high percentage of changes over time, the refresh interval for content attributed to that creator is shorter than a default refresh interval or refresh interval for a creator with a low percentage of changes over time. Similarly, metadata and history data for the domain/portion of the domain of the hyperlink, if available, is used to set the refresh interval. The more often content changes within a domain/portion of the domain, the shorter the refresh rate.

As described above, the network service analyzes the resource to identify one or more creators of the content of the resource, a trust score, and a recommended refresh interval. In one embodiment, the network service associates a trust score with the, creator, domain, or portion of the domain. In one embodiment, the network service maintains the trust score that represents how trustworthy the information from that domain is. For example, if a hyperlink includes a recommended refresh interval, but the network service determines from a history of changes for the linked resource/domain/portion of the domain that a shorter or longer refresh interval is more appropriate, the trust score is updated to indicate a lower level of trust for recommended refresh intervals acquired from the creator. The network service determines whether, or how, to use a recommended refresh interval based upon the trust score.

With an initial refresh interval set for the cached data, at block 130, the network service determines if additional requests received include or map to the same hyperlink. For example, upon receiving a request, the network service searches for a matching hyperlink within the cache.

If an additional request has been received, at block 135, the network service determines if the refresh interval has expired. For example, if an initial interval was set to three hours and only two hours have passed before receiving an additional request, the interval has not expired. If the interval has not expired, at block 140, the request is serviced (as described herein) using the data stored in the cache.

If the refresh interval has expired, at block 145, the network service reacquires the data. Additionally, the network service updates the resource metadata and history data as applicable. For example, the network service determines if any or a threshold amount of the content data has changed from the previous acquisition and updates the corresponding metadata and history data. Method 100 then returns to block 125 to reset or update the refresh interval. If the metadata and/or history data for the resource/domain/portion of the domain has not changed, or not changed beyond a threshold amount, the network service utilizes the same refresh interval. Otherwise, the network service increases or decreases the refresh interval based upon changes to the metadata or history data. For example, if the network service determines that the refresh interval is to be decreased, it may be decreased using an exponential backoff algorithm based upon the time of the previous change. Refresh interval increases may also be made exponentially. Additionally, different domains may have the refresh interval adjusted by different amounts. For example, the network service may decrease the refresh interval for a hyperlink to a domain that changes content frequently (e.g., a news website) by a small amount while decreasing the refresh interval for a hyperlink to a domain that changes infrequently by a large amount. Additionally, the network service may increase or decrease the refresh interval by an amount based upon user engagement. For example the network service may decrease the refresh interval for a hyperlink to a domain with greater user engagement (e.g., above a threshold value) by a small amount while decreasing the refresh interval for a hyperlink to a domain with less user engagement (e.g., below a threshold value) by a large amount. In one embodiment, the threshold used to determine whether or not to update the refresh interval includes a percentage of time in which one or more portions of content change over time. For example, if a domain has a history of content changing at or above a threshold of 40% of the time between acquisitions of data from the domain, the refresh interval is increased to reacquire data at a greater rate. In one embodiment, changes to content that the network considers in updating the refresh interval include changes to the hyperlink, title, image(s), creator, and resource in its entirety.

In one embodiment, if the network service determines that content data has changed, the network service updates the response(s) to the received request(s). For example, as described above, a social networking system services a request by publishing a post including a preview of the content. If the content that made up the preview changed, the social networking system updates the published post with an updated preview (e.g., adding/replacing a preview image, preview title, etc.).

If an additional request is not received at block 130, the network service returns to block 130 and awaits an additional request (e.g., until the data is removed from the cache). Alternatively, the network service optionally (as illustrated by the use of broken line) determines if the refresh interval has expired at block 150. If the refresh interval has not expired, the network service returns to block 130 and awaits an additional request. If the refresh interval has expired, method 100 continues with block 145 as described above. As a result, the network service may reacquire the data and update the resource metadata and history data in response to an additional request or simply in response to the expiration of the refresh interval.

Figure 2:
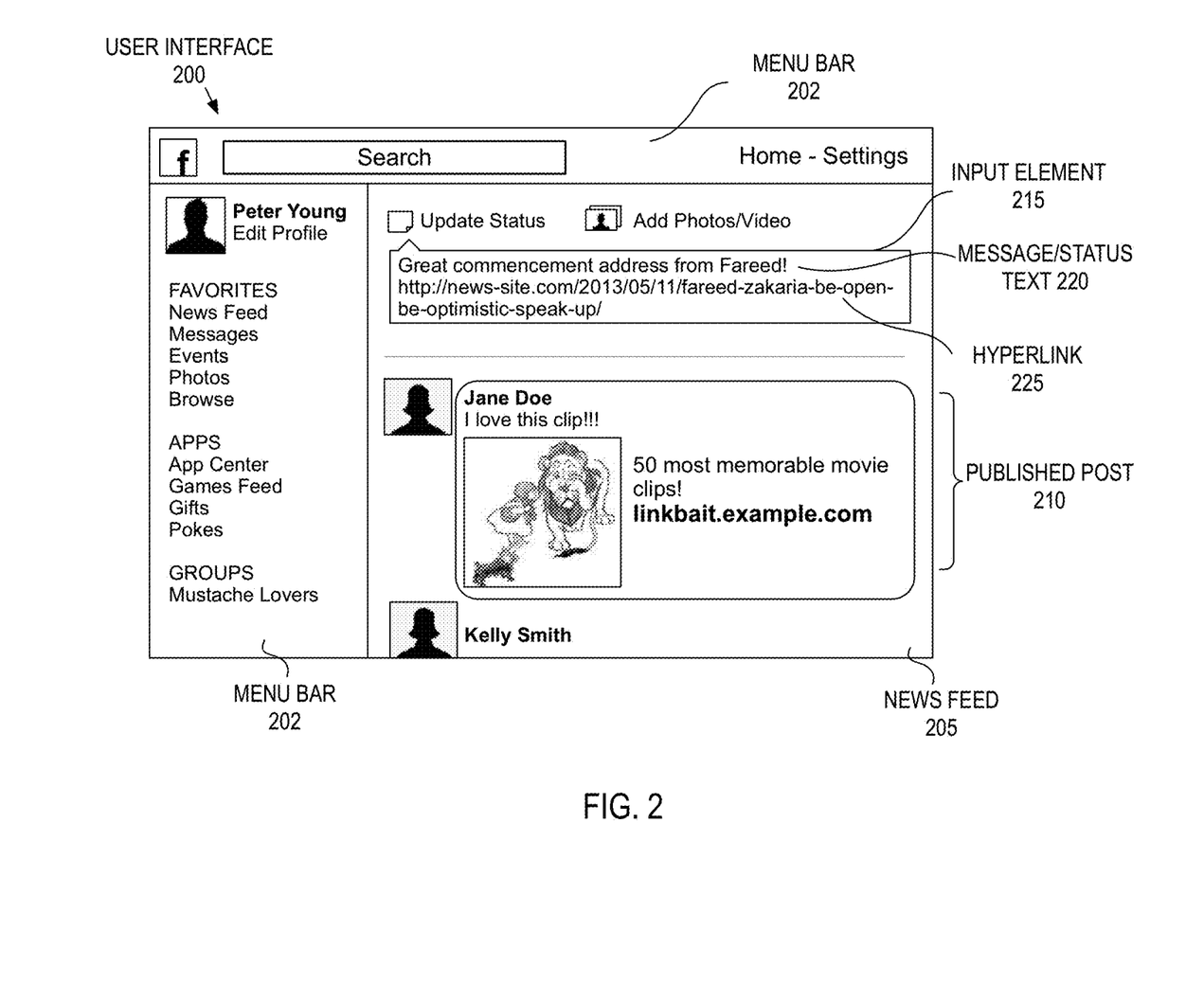
FIG. 2 illustrates a user interface of a social networking system including a user input element to enable a user to share a hyperlink.

FIG. 2 illustrates exemplary user interface 200 of a social networking system including a user input element to enable a user to share a hyperlink. User interface 200 is presented within a user application of a user device. Menu bars 202 include a search box allowing a user to input text to search for people, places, things, etc.; icons allowing the user to view messages and notifications, edit privacy settings, log out of the system, navigate to a home page, and view or edit the user's profile information; and a set of links to parts of the social networking system. News feed 205 includes a set of one or more published posts 210. The depicted published post 210 is a user-generated publication, and includes text and a preview of content from a resource shared by the user.

User interface 200 also includes input element 215 allowing the user (e.g., "Peter Young") to create a post including one or more of text, photographs, video, and a hyperlink to the social networking system. Additionally, input element 215 enables the social networking system to receive a hyperlink as described with reference to block 105 of FIG. 1. Within user input element 215, the user has input message or status text 220 of "Great commencement address from Fareed!" along with hyperlink 225 (i.e., a URL) for a webpage hosted by the domain "news-site.com" and including a transcription of a commencement address. When the user has finished composing the post, the user may press an "enter" or "return" keyboard button, click a button, or perform some other user input action to create a publication to the social network. In response, the user device transmits text 220 and hyperlink 225 to the social networking system. Alternatively, the social networking system may receive hyperlink 225 as the user is entering hyperlink 225 into input element 215 and prior to performing an action to publish the post/message to the social network.

In one embodiment, the social networking system determines that hyperlink 225 is included within the received message. This determination may occur based upon hyperlink 225 having been detected by the user application and tagged as such within the message. Alternatively, the social networking system detects hyperlink 225. This detection may utilize a matching algorithm looking for a particular format of a text string, e.g., adhering to a URL pattern.

In an alternate embodiment, the network service is a search engine, news aggregator, archive service, or another network service that caches or otherwise stores data acquired from a website or other source referenced by a hyperlink. In one embodiment, the network service receives a request including one or more keywords. The network service maps the keyword(s) to a hyperlink. In one embodiment, the network service utilizes a web crawler or web scraper application (e.g., as described with reference to FIG. 5) to acquire/reacquire and cache data from a list of one or more linked sources. The list of one or more linked resources is an exemplary received request including a hyperlink.

Figure 3:
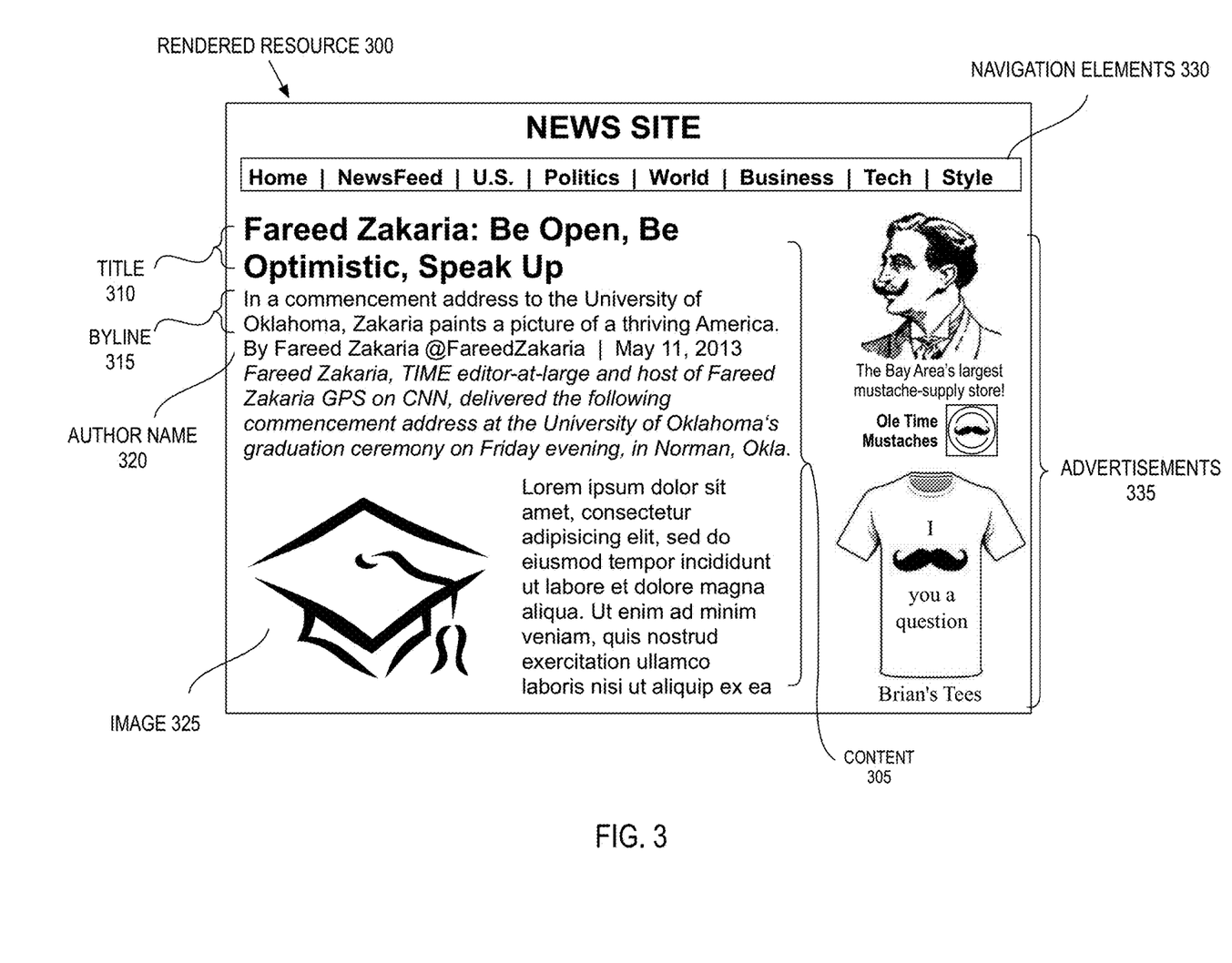
FIG. 3 illustrates the linked resource including content to be shared via posting the hyperlink to the social network.

FIG. 3 illustrates a rendered view of linked resource 300, including content to be shared via posting hyperlink 225 to the social network. Rendered resource 300 is an example of how an application (e.g., a web browser, social network application) presents the resource to a user and is an example of data acquired and stored by a network service, as described with reference to blocks 110 and 120 of FIG. 1. The resource itself, however, likely includes other data and metadata including HTML code (e.g., HTML elements, metadata, meta tags, etc.), CSS code, JavaScript code, etc. that the network service may acquire.

Rendered resource 300 includes content 305. Content 305 is an article that includes title 310, byline 315, author name 320, and image 325. A request including hyperlink 225 enables a user of the network service to share, preview, or receive at least a portion of content 305.

In one embodiment, the network service acquires particular data from resource 300. For example, the network service uses tags within the resource and/or an identification algorithm to select data within content 305 to acquire. For example, the network service may selectively acquire one or more of title 310, byline 315, author name 320, image 325, and the remainder of content 305 or a portion thereof (e.g., to serve as a summary of content 305). If content 305 includes multiple images 325, identification algorithm may select an image as the most likely to be representative of content 305 (e.g., based upon location of the image within rendered content 300, size of the image, or other metadata for the image). In one embodiment, the network service presents the multiple images 325 to a user for selection of a representative image.

Rendered resource 300 includes other items, such as navigation elements 330 and advertisements 335. Navigation elements 330 enable a user to follow links to other resources, e.g., internal and external to a website/domain of rendered resource 300. Advertisements 335 present advertiser information, images, and/or links to the user. Navigation elements 330 and advertisements 335, however, are typically not the reason a hyperlink is shared or otherwise sought for a preview or search result. As a result, the network service may exclude navigation elements 330 and advertisements 335 from the data being acquired.

Figure 4:
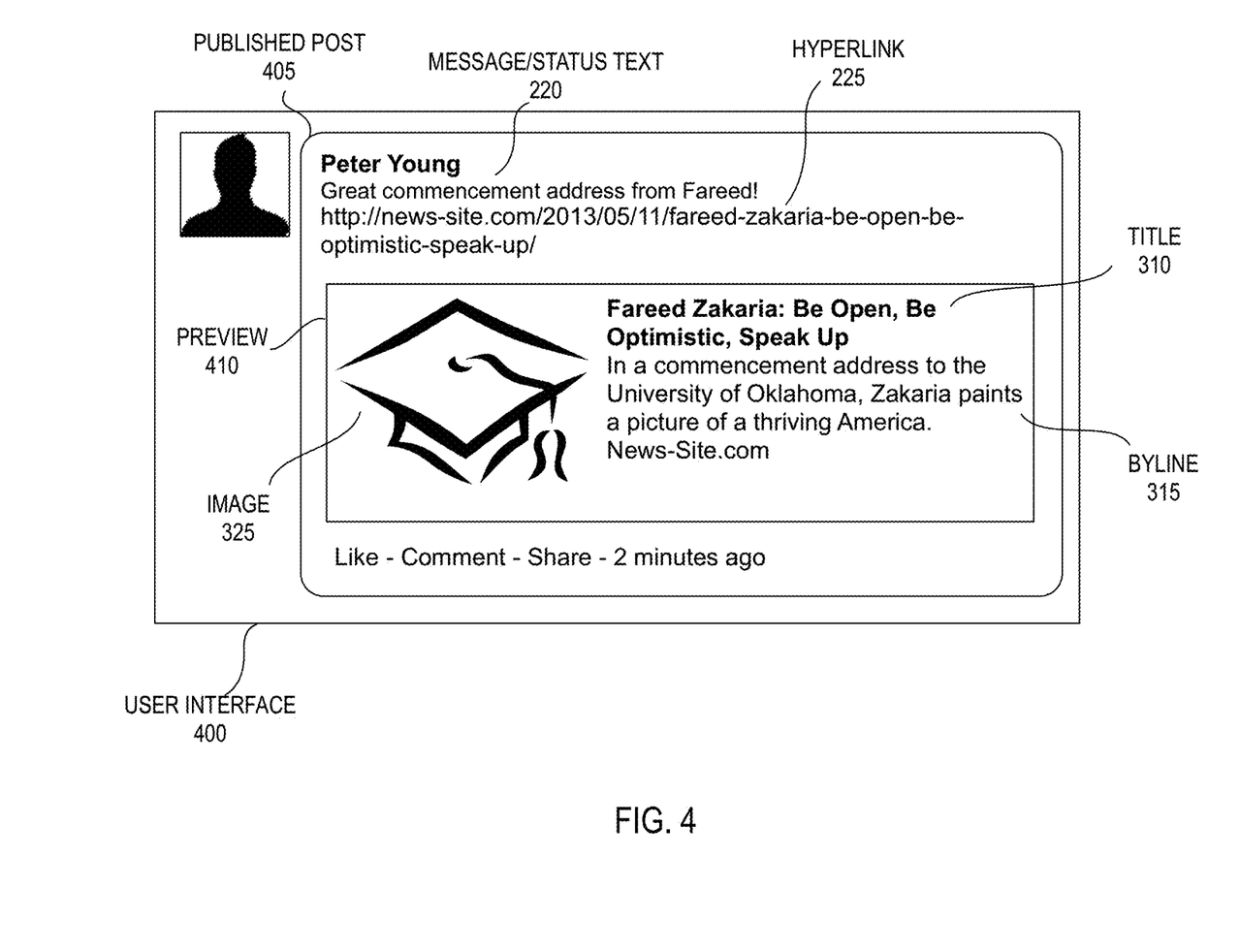
FIG. 4 illustrates a published post shared in the social networking system utilizing the hyperlink and data from the linked resource.

FIG. 4 illustrates exemplary published post 405 shared in the social networking system utilizing hyperlink 225 and data from the linked resource 300. For example, post 425 may appear within a news feed of the user and one or more other users of the social network, such as the "friends" of the user or "friends-of-friends" of the user, as dictated by the user's privacy settings. Post 405 includes message text 220 and hyperlink 225. Additionally, post 405 includes preview 410 of content 305 found at resource 300 referenced by hyperlink 225. Preview 410 includes title 310, byline 315, and image 325. As described above, more or less content 305 may be acquired. As a result, different portions of content 305 may be used as a part of preview 410. Additionally, in one embodiment, the social networking system updates one or more portions of preview 410 in response to reacquiring content 305 and determining that content 305 has changed.

Other network services similarly use acquired data from content 305 to service a request as described with reference to block 115 of FIG. 1. For example, a search engine may generate previews of content 305 along with hyperlinks corresponding to search results.

Figure 5:
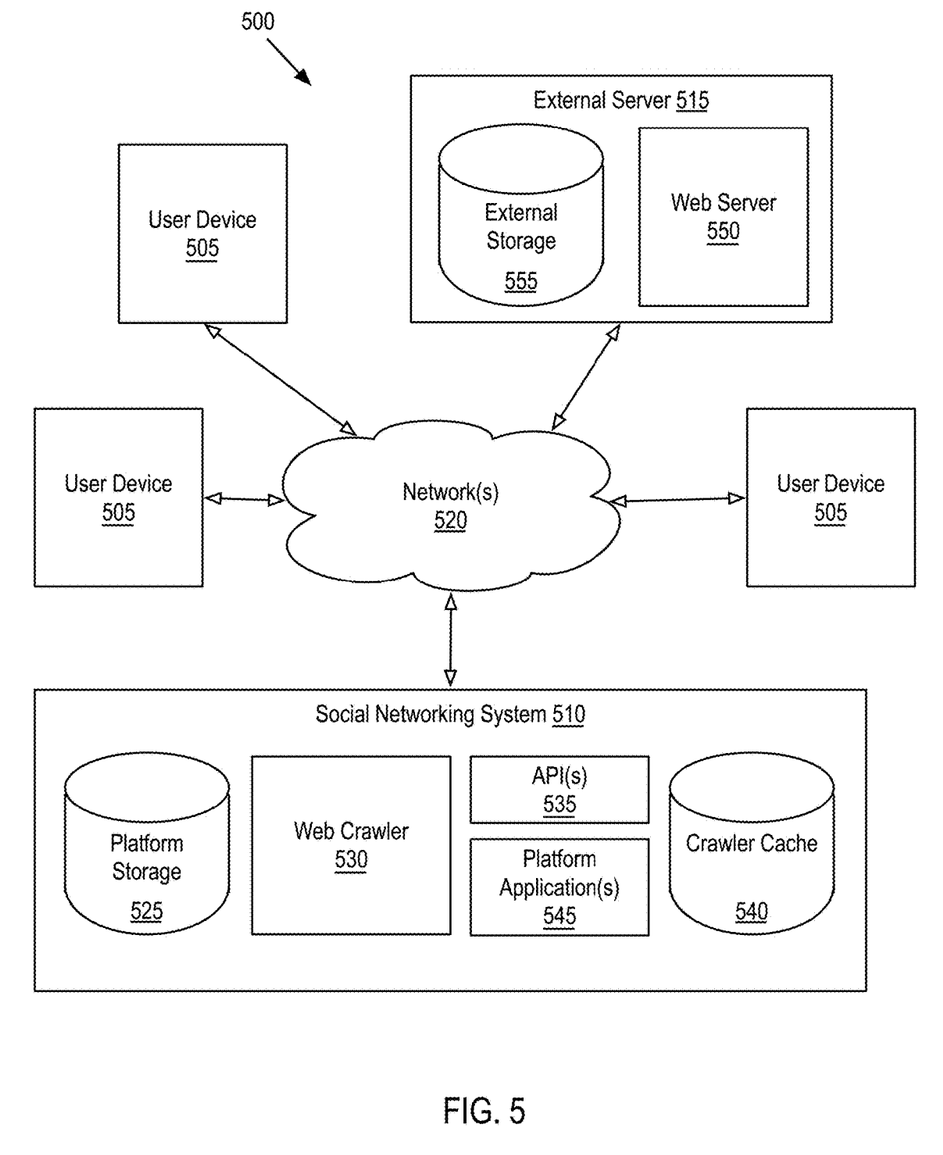
FIG. 5 illustrates, in block diagram form, an exemplary network service to implement the maintenance of cached data extracted from a linked resource.

FIG. 5 illustrates, in block diagram form, exemplary network service 500 to implement the maintenance of cached data extracted from a linked resource. Network service 500 will be described with reference to social networking system 510. As described herein, however, other network services may implement the maintenance of cached data extracted from a linked resource as described herein and would include similar features to social networking system 510.

Social network 500 includes user devices 505, social networking system 510, and external server 515 coupled to one or more networks 520. A user interacts with the social networking system 510 using a user device 505, such as a personal computer or a mobile phone. For example, the user device 505 communicates with the social networking system 510 via an application such as a web browser or native application as described with reference to FIGS. 1-4. Other typical interactions between the user device 505 and the social networking system 510 include operations such as viewing profiles of other users of the social networking system 510, contributing and interacting with media items, joining groups, listing and confirming attendance at events, checking in at locations, liking certain pages/posts, creating pages, and performing other tasks that facilitate social interaction.

The social networking system 510 includes platform storage 525, web crawler 530, one or more application programming interfaces (API's) 535, crawler cache 540, and one or more platform applications 545. Platform storage 525 stores user preferences/settings, profile data, interaction data, object metadata, demographic data, etc. Exemplary platform applications 545 include the platform for social interactions (e.g., publishing posts including text, pictures, hyperlinks, etc.) as well as social games, messaging services, and any other application that uses the social platform provided by the social networking system 510. For example, social networking system 510 may perform method 100 (e.g., using web crawler 530) in response to receiving a request including a hyperlink via a platform application 545, e.g., NYTimes app publishes a URL in to social networking system 510 via API 535. While illustrated as a single block, social networking system 510 may include a plurality of servers and/or data stores.

One or more API's 535 enable external applications 550 to work with the social networking system 510. For example, an external application utilizes an API 535 to authenticate a user based upon the user's social networking log in username and password. Additionally, an external application utilizes one or more API's 535 to run the application within the platform application, to publish a post to the platform application, to access the user's social network connections, etc. In one embodiment, the network service performs method 100 (e.g., using web crawler 530) in response to receiving a request including a hyperlink via API 535.

External server 515 includes web server 550 and external storage 555. Web server 550 manages requests for a resource stored within external storage 555. For example, resource 300 may be stored within external storage 555 and requests from a user device 505 to render the corresponding resource are handled by web server 550.

In one embodiment, the web crawler 530 utilizes crawler cache 540 to perform method 100 described above. For example, web crawler 530 receives a request from a user device 505 and acquires data from external server 515. Platform application 545 utilizes the acquired data to create a preview or publication as described with reference to FIG. 4. Additionally, web crawler 530 stores the acquired data in crawler cache 540 along with metadata and history data. Web crawler 530 sets and updates the refresh interval and reacquires the data as applicable. The social networking system 510 services additional requests received within the refresh interval using the data stored in crawler cache 540.

Figure 6:
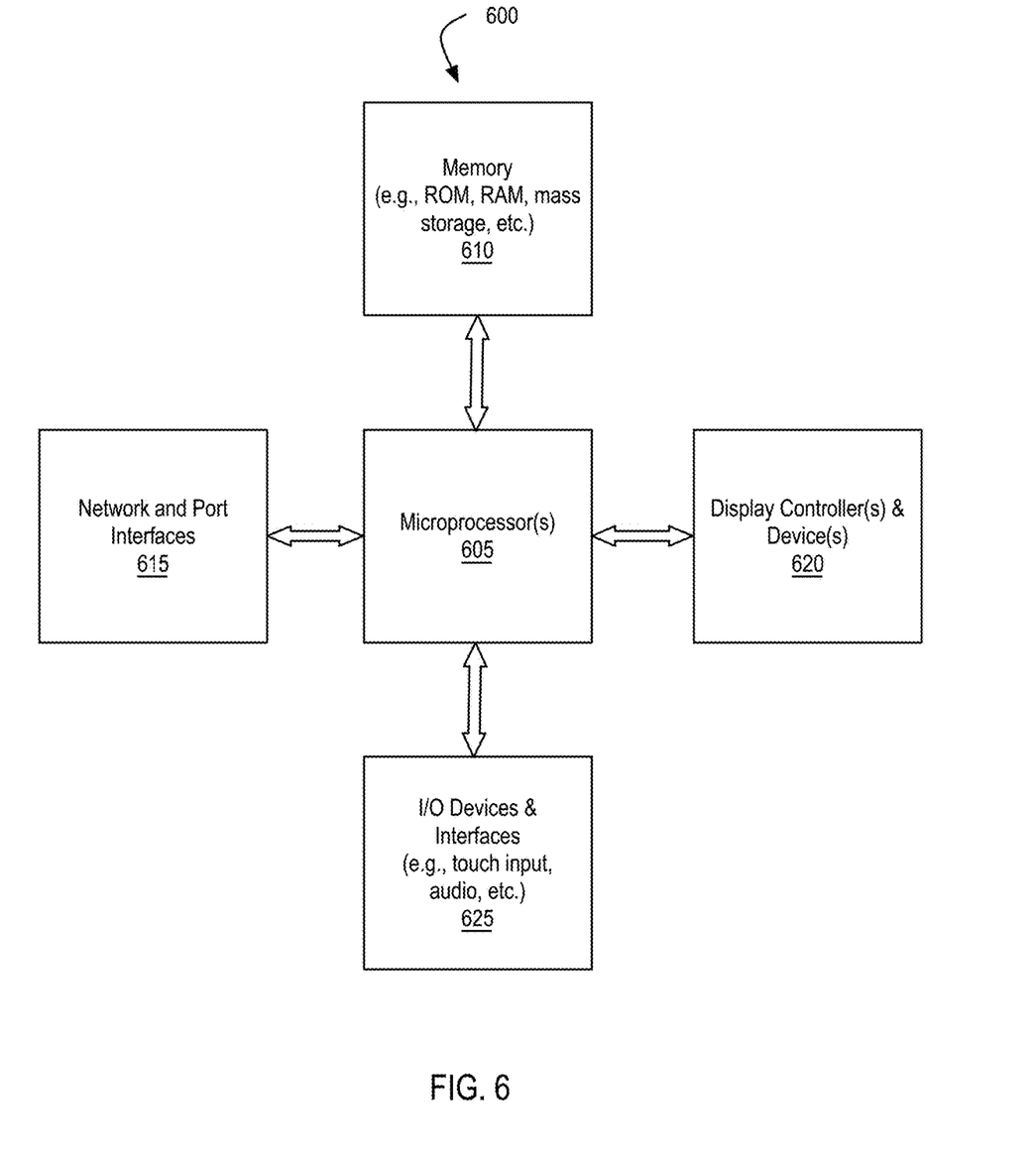
FIG. 6 illustrates, in block diagram form, an exemplary processing system to implement the maintenance of cached data extracted from a linked resource.

FIG. 6 illustrates, in block diagram form, exemplary processing system 600 to implement the maintenance of cached data extracted from a linked resource. Data processing system 600 includes one or more microprocessors 605 and connected system components (e.g., multiple connected chips). Alternatively, data processing system 600 is a system on a chip.

Data processing system 600 includes memory 610, which is coupled to microprocessor(s) 605. Memory 610 may be used for storing data, metadata, and programs for execution by the microprocessor(s) 605. Memory 610 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 610 may be internal or distributed memory.

Data processing system 600 includes network and port interfaces 615, such as a port, connector for a dock, or a connector for a USB interface, FireWire, Thunderbolt, Ethernet, Fibre Channel, etc. to connect the system 600 with another device, external component, or a network. Exemplary network and port interfaces 615 also include wireless transceivers, such as an IEEE 802.11 transceiver, an infrared transceiver, a Bluetooth transceiver, a wireless cellular telephony transceiver (e.g., 2G, 3G, 4G, etc.), or another wireless protocol to connect data processing system 600 with another device, external component, or a network and receive stored instructions, data, tokens, etc.

Data processing system 600 also includes display controller and display device 620 and one or more input or output ("I/O") devices and interfaces 625. Display controller and display device 620 provides a visual user interface for the user. I/O devices 625 allow a user to provide input to, receive output from, and otherwise transfer data to and from the system. I/O devices 625 may include a mouse, keypad or a keyboard, a touch panel or a multi-touch input panel, camera, optical scanner, audio input/output (e.g., microphone and/or a speaker), other known I/O devices or a combination of such I/O devices.

It will be appreciated that one or more buses, may be used to interconnect the various components shown in FIG. 6.

Data processing system 600 is an exemplary representation of one or more of user devices 505, components of social networking system 510, and components of external server 515 described above. Data processing system 600 may be a personal computer, tablet-style device, a personal digital assistant (PDA), a cellular telephone with PDA-like functionality, a Wi-Fi based telephone, a handheld computer which includes a cellular telephone, a media player, an entertainment system, or devices which combine aspects or functions of these devices, such as a media player combined with a PDA and a cellular telephone in one device. In other embodiments, data processing system 600 may be a network computer, server, or an embedded processing device within another device or consumer electronic product. As used herein, the terms computer, device, system, processing system, processing device, and "apparatus comprising a processing device" may be used interchangeably with data processing system 600 and include the above-listed exemplary embodiments.

It will be appreciated that additional components, not shown, may also be part of data processing system 600, and, in certain embodiments, fewer components than that shown in FIG. 6 may also be used in data processing system 600. It will be apparent from this description that aspects of the inventions may be embodied, at least in part, in software. That is, the computer-implemented method 100 may be carried out in a computer system or other data processing system 600 in response to its processor or processing system 605 executing sequences of instructions contained in a memory, such as memory 610 or other non-transitory machine-readable storage medium. The software may further be transmitted or received over a network (not shown) via network interface device 615. In various embodiments, hardwired circuitry may be used in combination with the software instructions to implement the present embodiments. Thus, the techniques are not limited to any specific combination of hardware circuitry and software, or to any particular source for the instructions executed by data processing system 600.

An article of manufacture may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of non-transitory machine-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. References in the specification to "one embodiment," "an embodiment," "an exemplary embodiment," etc., indicate that the embodiment described may include a particular feature, structure, or characteristic, but not every embodiment may necessarily include the particular feature, structure, or characteristic. Moreover, such phrases are not necessarily referring to the same embodiment. Furthermore, when a particular feature, structure, or characteristic is described in connection with an embodiment, such feature, structure, or characteristic may be implemented in connection with other embodiments whether or not explicitly described. Blocks with dashed borders (e.g., large dashes, small dashes, dot-dash, dots) are used herein to illustrate optional operations that add additional features to embodiments of the invention. However, such notation should not be taken to mean that these are the only options or optional operations, and/or that blocks with solid borders are not optional in certain embodiments of the invention. Numerous specific details are described to provide a thorough understanding of various embodiments of the present invention. However, in certain instances, well-known or conventional details are not described in order to provide a concise discussion of embodiments of the present inventions.

It will be evident that various modifications may be made thereto without departing from the broader spirit and scope of the invention as set forth in the following claims. For example, the methods described herein may be performed with fewer or more features/blocks or the features/blocks may be performed in differing orders. Additionally, the methods described herein may be repeated or performed in parallel with one another or in parallel with different instances of the same or similar methods.

What is claimed is:

1. A computer-implemented method comprising:
    acquiring, by a communication system, data from a resource referenced by a hyperlink;
    storing the acquired data within a communication system cache;
    setting a frequency value of a refresh interval for the data stored in the cache, wherein the communication system utilizes the stored data to respond to subsequent requests for the data received during the refresh interval and the communication system reacquires data from the resource after expiration of the refresh interval;
    accessing a received request for the data referenced by the hyperlink;
    updating, in response to the request, a number of times the communication system received requests for the data;
    updating the refresh interval by increasing or decreasing the frequency value of the refresh interval in response to an amount of change to data associated with the resource over time and the number of times the communication system received requests for the data, wherein a first frequency value for a first resource is adjusted by a first amount in response to a first amount of change to data associated with the first resource over time, and wherein a second frequency value for a second resource is adjusted by a second amount in response to a second amount of change to data associated with the second resource over time; and
    sending the hyperlink and the acquired data to a client device, wherein the acquired data is sent as a preview of content of the resource referenced by the hyperlink.

2. The computer-implemented method of claim 1, wherein the communication system reacquires data from the resource after refresh intervals in response to accessing a subsequent request for the data.

3. The computer-implemented method of claim 1, wherein the refresh interval is set or updated based upon a history of changes to data within at least a portion of a website associated with a domain name of the resource.

4. The computer-implemented method of claim 3, wherein the history of changes includes an amount of change to titles, images, or text on pages within the portion of the website.

5. The computer-implemented method of claim 4, wherein the amount of change includes a percentage of times the titles, images, or text on the pages changed during the refresh interval and wherein the refresh interval is increased in response to determining that the percentage is above a threshold.

6. The computer-implemented method of claim 3, wherein advertising content is excluded from the history of changes.

7. The computer-implemented method of claim 1, wherein the refresh interval is set or updated based upon a metadata for at least a portion of a website associated with a domain name of the resource.

8. The computer-implemented method of claim 7, wherein the metadata includes the number of times the communication system receives requests for the data, a number of times the communication system receives requests including other data within the portion of the website, or a category assigned to the portion of the website.

9. The computer-implemented method of claim 1, wherein the communication system is a social networking system, and wherein the data is acquired in response to a request including the hyperlink and received from the client device as input for a publication to the social networking system.

10. A non-transitory computer-readable medium storing instructions which, when executed by one or more processors in a processing device, cause the processing device to perform a method comprising:
    acquiring, by a communication system, data from a resource referenced by a hyperlink;
    storing the acquired data within a communication system cache;
    setting a frequency value of a refresh interval for the data stored in the cache, wherein the communication system utilizes the stored data to respond to subsequent requests for the data received during the refresh interval and the communication system reacquires data from the resource after expiration of the refresh interval;
    accessing a received request for the data referenced by the hyperlink;
    updating, in response to the request, a number of times the communication system received requests for the data;
    updating the refresh interval by increasing or decreasing the frequency value of the refresh interval in response to an amount of change to data associated with the resource over time and the number of times the communication system received requests for the data, wherein a first frequency value for a first resource is adjusted by a first amount in response to a first amount of change to data associated with the first resource over time, and wherein a second frequency value for a second resource is adjusted by a second amount in response to a second amount of change to data associated with the second resource over time; and sending the hyperlink and the acquired data to a client device, wherein the acquired data is sent as a preview of content of the resource referenced by the hyperlink.

11. The computer-readable medium of claim 10, wherein the communication system reacquires data from the resource after refresh intervals in response to accessing a subsequent request for the data.

12. The computer-readable medium of claim 10, wherein the refresh interval is set or updated based upon a history of changes to data within at least a portion of a website associated with a domain name of the resource.

13. The computer-readable medium of claim 12, wherein the history of changes includes an amount of change to titles, images, or text on pages within the portion of the website.

14. The computer-readable medium of claim 13, wherein the amount of change includes a percentage of times the titles, images, or text on the pages changed during the refresh interval and wherein the refresh interval is increased in response to determining that the percentage is above a threshold.

15. The computer-readable medium of claim 12, wherein advertising content is excluded from the history of changes.

16. The computer-readable medium of claim 10, wherein the refresh interval is set or updated based upon a metadata for at least a portion of a website associated with a domain name of the resource.

17. The computer-readable medium of claim 16, wherein the metadata includes the number of times the communication system receives requests for the data, a number of times the communication system receives requests including other data within the portion of the website, or a category assigned to the portion of the website.

18. The computer-readable medium of claim 10, wherein the communication system is a social networking system, and wherein the data is acquired in response to a request including the hyperlink and received from the client device as input for a publication to the social networking system.

19. An apparatus comprising:
a processing device, wherein the processing device executes instructions that cause the apparatus to perform a method comprising:
acquiring, by a communication system, data from a resource referenced by a hyperlink;
storing the acquired data within a communication system cache;
setting a frequency value of a refresh interval for the data stored in the cache, wherein the communication system utilizes the stored data to respond to subsequent requests for the data received during the refresh interval and the communication system reacquires data from the resource after expiration of the refresh interval;
accessing a received request for the data referenced by the hyperlink;
updating, in response to the request, a number of times the communication system received requests for the data;
updating the refresh interval by increasing or decreasing the frequency value of the refresh interval in response to an amount of change to data associated with the resource over time and the number of times the communication system received requests for the data, wherein a first frequency value for a first resource is adjusted by a first amount in response to a first amount of change to data associated with the first resource over time, and wherein a second frequency value for a second resource is adjusted by a second amount in response to a second amount of change to data associated with the second resource over time; and
sending the hyperlink and the acquired data to a client device, wherein the acquired data is sent as a preview of content of the resource referenced by the hyperlink.

* * * * *